US010640223B2

(12) United States Patent
Lacko (10) Patent No.: US 10,640,223 B2
(45) Date of Patent: May 5, 2020

(54) SAFETY MAINTENANCE PANEL FOR A THRUST REVERSER

(71) Applicant: ROHR, INC., Chula Vista, CA (US)

(72) Inventor: Anthony Lacko, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 336 days.

(21) Appl. No.: 15/683,608

(22) Filed: Aug. 22, 2017

(65) Prior Publication Data
US 2019/0061967 A1    Feb. 28, 2019

(51) Int. Cl.
| B64D 29/08 | (2006.01) |
| F02K 1/60 | (2006.01) |
| F02K 1/76 | (2006.01) |
| B64F 5/40 | (2017.01) |
| B64D 29/06 | (2006.01) |
| F01D 25/24 | (2006.01) |

(52) U.S. Cl.
CPC ............. *B64D 29/08* (2013.01); *B64D 29/06* (2013.01); *B64F 5/40* (2017.01); *F01D 25/24* (2013.01); *F02K 1/60* (2013.01); *F02K 1/766* (2013.01); *F05D 2230/80* (2013.01); *F05D 2260/30* (2013.01); *F05D 2260/36* (2013.01)

(58) Field of Classification Search
CPC ... B64D 29/08; F02K 1/70; F02K 1/76; F02K 1/766
USPC ......................................................... 244/129
See application file for complete search history.

(56) References Cited

U.S. PATENT DOCUMENTS

| 4,629,146 A | 12/1986 | Lymons |
| 6,625,972 B1 | 9/2003 | Sternberger |
| 9,677,502 B2 | 6/2017 | Caruel |
| 2004/0262312 A1* | 12/2004 | Hagano .............. B60K 15/0406 220/293 |
| 2016/0108853 A1* | 4/2016 | Gormley ................. F02K 1/763 239/265.19 |
| 2016/0264249 A1 | 9/2016 | Lozano et al. |
| 2017/0022935 A1* | 1/2017 | Corentin ................... F02K 1/60 |
| 2018/0171664 A1* | 6/2018 | Frommer .............. F04D 27/001 |

FOREIGN PATENT DOCUMENTS

| EP | 3075998 | 10/2016 |
| WO | 2015010271 | 1/2015 |

OTHER PUBLICATIONS

Rallynuts Motorsport, Eye Bolt Fastenings, Jul. 25, 2016, https://www.rallynuts.com/installation-hardware/harness-eye-bolts.htra (Year: 2016).*

(Continued)

*Primary Examiner* — Peter M Poon
*Assistant Examiner* — Nicholas E Brown
(74) *Attorney, Agent, or Firm* — Snell & Wilmer L.L.P.

(57) ABSTRACT

A safety maintenance panel for a thrust reverser is provided. The thrust reverser may comprise one or more doors configured to actuate from a closed position to a deployed position. The safety maintenance panel may be located on the thrust reverser. The safety maintenance panel may comprise a safety pin configured to engage the door in the deployed position to at least partially limit movement of the door from the deployed position. In that respect, the safety pin may be inserted into a panel pin hole through the maintenance panel and a door pin hole through the door to lock the door into the deployed position.

17 Claims, 5 Drawing Sheets

(56) References Cited

OTHER PUBLICATIONS

Atlantis Fitness, Weight Stack Pins, Aug. 9, 2017, https://www.exercise-equipment-parts.com/weight-stack-pins.html (Year: 2017).*

Thorlabs, Adjustable Angle Mounting Plate, Jun. 24, 2016, http://www.thorlabs.com/newgrouppage9.cfm?objectgroup_id=6135 (Year: 2016).*

Youtube, XEON2700, "Manual Deploying and Stow I NG of Thrust Reverser Translating Sleeves", Feb. 14, 2013 (Feb. 14, 2013), XP054978908, Retrieved from the Internet: URL:https://www.youtube.com/watch?v=2m4IYX 6uJKU [retrieved on Nov. 22, 2018] Video frames from min 1:00 to min 1:08 and from min 2:45 to min 2:53.

European Patent Office, European Search Report dated Dec. 10, 2018 in Application No. 18189817.2.

\* cited by examiner

SAFETY MAINTENANCE PANEL FOR A THRUST REVERSER

FIELD

The present disclosure relates to thrust reversers, and more specifically, to a safety maintenance panel for thrust reversers.

BACKGROUND

Typical aircraft engines and/or nacelles generally comprise a thrust reverser system. The thrust reverser system may be configured to provide reverse thrust to slow the aircraft during a landing event (e.g., after touchdown) by at least partially redirecting the flow of air in the bypass air duct in the forward direction of the aircraft. During maintenance of the thrust reverser system, doors of the thrust reverser may need to be retained in an open position for the safety of maintenance personnel and to reduce the likelihood of damage to components of the thrust reverser system.

SUMMARY

In various embodiments, a maintenance panel for a thrust reverser is disclosed. The maintenance panel may comprise a panel recess defining a recess on an outer surface of the thrust reverser; a panel pin hole defining a void through the panel recess; and a safety pin removably coupled to the panel recess, wherein the safety pin is configured to insert within the panel pin hole.

In various embodiments, the maintenance panel may further comprise a panel door having an interior surface opposite an exterior surface, wherein the panel door is rotatably coupled to the panel recess, and wherein the panel door is configured to rotate from a closed position to an open position to allow access to the maintenance panel. The interior surface of the panel door may comprise a high-visibility color. The panel door may be rotatably coupled to the panel recess with a spring-loaded hinge. The maintenance panel may further comprise a safety retainer coupled to the panel recess, wherein in response to the safety pin being inserted within the panel pin hole the safety retainer is configured to engage the safety pin. The safety pin may comprise a pin retaining body configured to engage the safety retainer. The maintenance panel may further comprise a pin holder coupled to the panel recess, wherein the safety pin is configured to removably couple to the panel recess via the pin holder. The maintenance panel may further comprise a safety pin tether coupled at a first end to the panel recess and at a second end to the safety pin, wherein the safety pin tether is configured to secure the safety pin. The safety pin may comprise a pin handle.

In various embodiments, a thrust reverser is disclosed. The thrust reverser may comprise a fixed beam; a door pivotally coupled to the fixed beam and configured to pivot from a closed position to a deployed position, wherein the door comprises a door pin hole defining a first void through an outer surface of the door; and a maintenance panel defining a panel recess on the fixed beam. The maintenance panel may comprise: a panel pin hole defining a second void through the panel recess, wherein the panel pin hole and the door pin hole are configured to align in response to the door being in the deployed position; and a safety pin removably coupled to the panel recess, wherein the safety pin is configured to insert through the panel pin hole and the door pin hole to at least partially prevent movement of the door from the deployed position.

In various embodiments, the thrust reverser may further comprise a panel door having an interior surface opposite an exterior surface, wherein the panel door is rotatably coupled to the panel recess, and wherein the panel door is configured to rotate from a closed panel position to an open panel position to allow access to the maintenance panel. The interior surface of the panel door may comprise a high-visibility color. The panel door may be rotatably coupled to the panel recess with a spring-loaded hinge. The thrust reverser may further comprise a safety retainer coupled to the panel recess, wherein in response to the safety pin being inserted within the panel pin hole the safety retainer is configured to engage the safety pin. The safety pin may comprise a pin retaining body configured to engage the safety retainer. The thrust reverser may further comprise a pin holder coupled to the panel recess, wherein the safety pin is configured to removably couple to the panel recess via the pin holder. The thrust reverser may further comprise a safety pin tether coupled at a first end to the panel recess and at a second end to the safety pin, wherein the safety pin tether is configured to secure the safety pin.

In various embodiments, a method of locking a door on a thrust reverser into a deployed position is disclosed. The method may comprise: removing a safety pin from a maintenance panel, wherein the maintenance panel defines a panel recess on an outer surface of the thrust reverser; and inserting the safety pin through a panel pin hole and a door pin hole, wherein the panel pin hole defines a first void through the panel recess and the door pin hole defines a second void through the door, and wherein in response to the safety pin being inserted through the panel pin hole and the door pin hole, movement of the door from the deployed position is at least partially limited.

In various embodiments, the method may further comprise rotating the safety pin to engage a safety retainer, wherein the safety retainer is coupled to the panel recess. The method may further comprise accessing the maintenance panel by opening a panel door pivotally coupled to the panel recess.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Figure 1A:
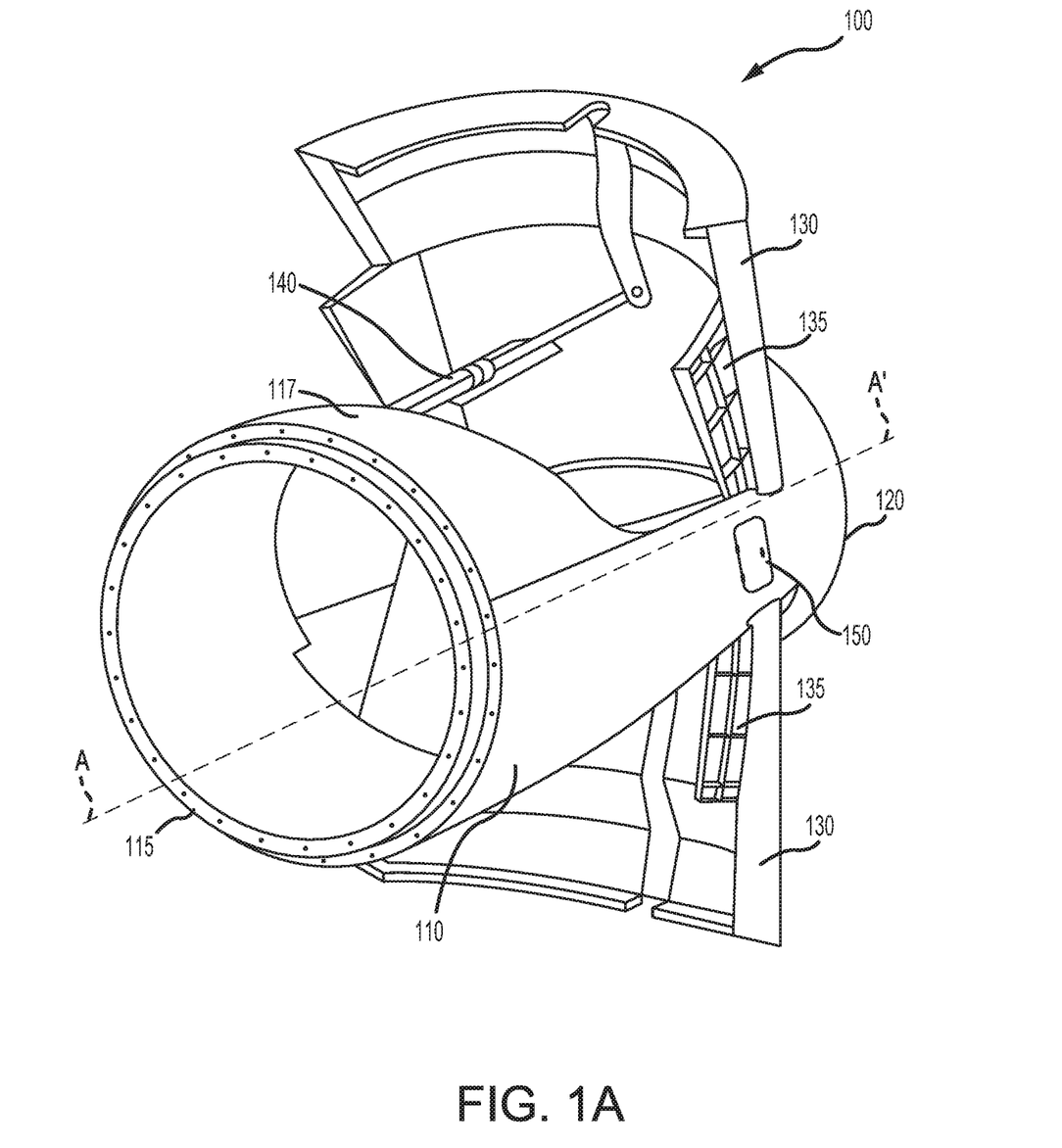
FIG. 1A illustrates a perspective view of a thrust reverser in a deployed position, in accordance with various embodiments.
Figure 1B:
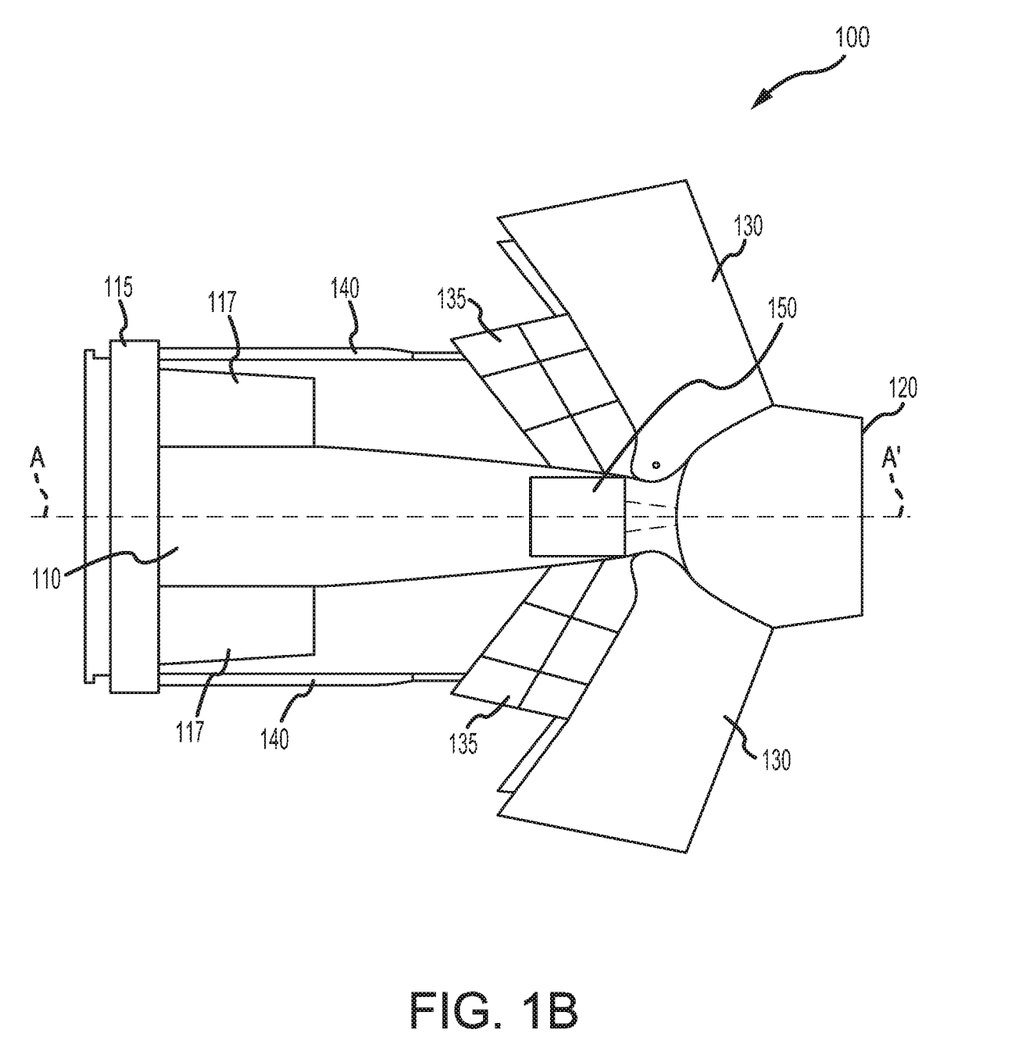
FIG. 1B illustrates a schematic view of a thrust reverser in the deployed position, in accordance with various embodiments.

In various embodiments, and with reference to FIGS. 1A and 1B, a thrust reverser 100 is disclosed. Thrust reverser 100 may be configured to provide reverse thrust to slow an aircraft during a landing event (e.g., after touchdown) by at least partially redirecting the flow of air in the bypass air duct in the forward direction of the aircraft. Thrust reverser 100 may rotate along an engine axis of rotation A-A'.

In various embodiments, thrust reverser 100 may comprise a fixed beam 110. Fixed beam 110 may be coupled to a forward structure 115 at a forward end and to a nozzle 120 at an aft end. Forward structure 115 may be configured to couple thrust reverser 100 to a gas turbine engine. Fixed beam 110 may also be coupled to a fixed panel 117 proximate the coupling of fixed beam 110 to forward structure 115. Fixed panel 117 may be coupled at a forward end to forward structure 115. Nozzle 120 may be configured to allow for the flow of air from the gas turbine engine through thrust reverser 100.

In various embodiments, thrust reverser 100 may comprise one or more doors 130. Fixed beam 110, fixed panel 117, and doors 130 may define a main body of thrust reverser 100. Thrust reverser 100 may comprise any suitable number of doors 130, such as, for example, two doors 130 spaced equidistant in the circumferential direction. Doors 130 may be pivotally coupled to fixed beam 110 at a location proximate nozzle 120. Doors 130 may be configured to pivot in a radial direction away from fixed beam 110. Doors 130 may also be coupled to a fixed fitting 135. Fixed fitting 135 may be pivotally coupled to fixed beam 110 at a location proximate the coupling of door 130 to fixed beam 110. Fixed fitting 135 may be configured to direct airflow to doors 130 during a reverse thrust mode (e.g., to ensure that the airflow is directed towards doors 130 to contribute to reverse thrust force). Doors 130 may be configured to pivot from a closed position into a deployed position (e.g., an open position). For example, during typical flight operation, doors 130 may remain in the closed position. During landing or other flight times when deceleration may be desired, doors 130 may be pivoted into the deployed position to further aid in deceleration of the aircraft.

In various embodiments, thrust reverser 100 may comprise one or more actuation systems 140 configured to actuate to deploy doors 130 into the closed position or the deployed position. Actuation system 140 may be coupled at a first end to fixed panel 117 and at a second end to fixed fitting 135. Actuation system 140 may also be coupled at the second end directly to door 130. Actuation system 140 may be configured to receive electronic commands to actuate doors 130 (e.g., from a full authority digital engine control (FADEC), pilot, maintenance personnel, or the like). For example, during landing the FADEC, pilot, or the like may command actuation system 140 to actuate doors 130 into the deployed position to decelerate the aircraft. As a further example, during maintenance of thrust reverser 100, maintenance personnel or the like may command actuation system 140 to actuate doors 130 into the deployed position to allow access to internal components of thrust reverser 100.

In various embodiments, thrust reverser 100 may comprise a maintenance panel 150 located on fixed beam 110. Maintenance panel 150 may be located in any suitable location, such as, for example, proximate the coupling of doors 130 to fixed beam 110. Maintenance panel 150 may be configured to provide a mechanism to mechanically lock doors 130 into the deployed position to at least partially prevent doors 130 from moving into the closed position. For example, during maintenance operations maintenance personnel may deploy doors 130 into the deployed position to access interior components of thrust reverser 100. In response to an inadvertent stow signal (e.g., a signal to command actuation system 140 to actuate doors 130 into the closed position) being sent to thrust reverser 100, thus causing doors 130 to actuate into the closed position, injury may be caused to the maintenance personnel and/or damage may be caused to doors 130 or other components of thrust reverser 100.

Figure 2A:
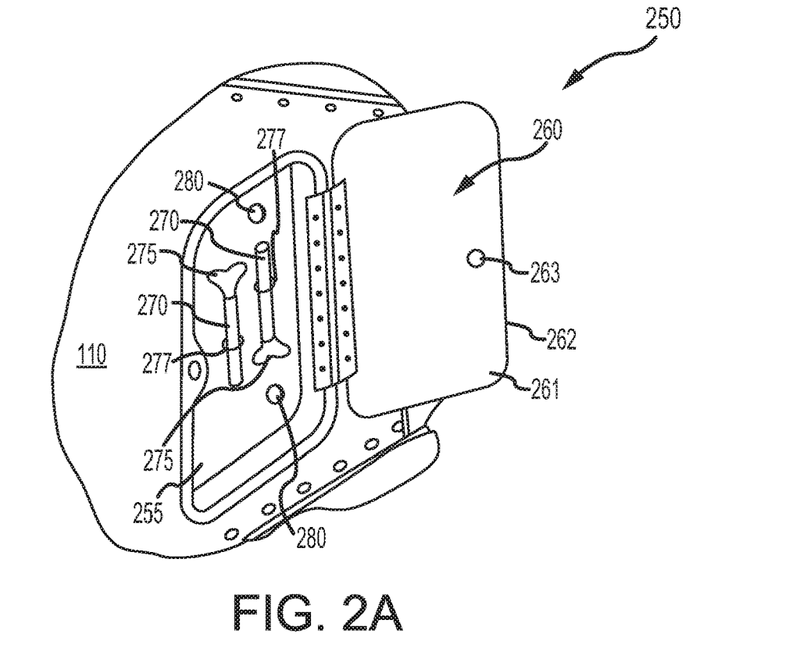
FIG. 2A illustrates a perspective view of a maintenance panel for a thrust reverser, in accordance with various embodiments.

In various embodiments, and with reference to FIG. 2A, a maintenance panel 250 is depicted in greater detail. Maintenance panel 250 may comprise a panel recess 255 defining a partial recess on an outer surface of fixed beam 110. Maintenance panel 250 may comprise a panel door 260 rotatably coupled to panel recess 255. Panel door 260 may be configured to rotate from a closed position to an open position. In the closed position panel door 260 may be configured to at least partially cover panel recess 255. In the open position panel door 260 may be configured to allow access to the components of maintenance panel 250. In various embodiments, panel door 260 may be rotatably coupled to panel recess 255 via a spring-loaded hinge. In that respect, the spring-loaded hinge may be configured to provide a spring force against panel door 260. For example, in response to panel door 260 being in the open position, the spring-loaded hinge may provide a first spring force to push panel door 260 in the open position (e.g., to at least partially limit unwanted closure of panel door 260). In response to panel door 260 being in the closed position, the spring-loaded hinge may provide a second spring force to pull panel door 260 in the closed position (e.g., to at least partially limit unwanted opening of panel door 260). In various embodiments, panel door 260 may also comprise a locking mechanism 263 configured to lock panel door 260 in the closed position. For example, locking mechanism 263 may comprise a rotatable lever, a bolt, a latch, or the like.

Panel door 260 may comprise an interior surface 261 radially opposite an exterior surface 262. In response to the panel door being in the closed position, exterior surface 262 may be at least partially flush with the outer surface of fixed beam 110. In various embodiments, interior surface 261 of panel door 260 may comprise a high-visibility color. In that respect, the high-visibility color may be configured to alert maintenance personnel or others that panel door 260 is in the open position (e.g., to alert personnel that maintenance is being performed on thrust reverser 100). The high-visibility color may comprise any suitable color capable of providing a contrast between interior surface 261 and fixed beam 110. For example, the high-visibility color may be red, yellow, orange, green, or any other suitable color, such as a fluorescent color. In various embodiments, interior surface 261 may also comprise a reflective surface, such as a reflective striping or the like.

In various embodiments, maintenance panel 250 may comprise a safety pin 270. Safety pin 270 may be configured to engage doors 130 in the deployed position to at least partially limit movement of doors 130 from the deployed position. In that respect, safety pin 270 may be configured to mechanically engage doors 130, as discussed further herein. Maintenance panel 250 may comprise any suitable number of safety pins 270. For example, maintenance panel 250 may comprise a safety pin 270 for each door 130 (with brief reference to FIGS. 1A and 1B). Safety pin 270 may comprise any suitable physical characteristic. For example, safety pin 270 may comprise any suitable shape, such as, for example, cylindrical, rectangular, or the like. Safety pin 270 may also comprise any suitable width and length. The width and length of safety pin 270 may be based on operational factors and thrust reverser 100 characteristics, such as, for example, the weight of doors 130 or the like. Safety pin 270 may also comprise any suitable coating, such as, for example, an anti-corrosion coating.

Figure 2B:
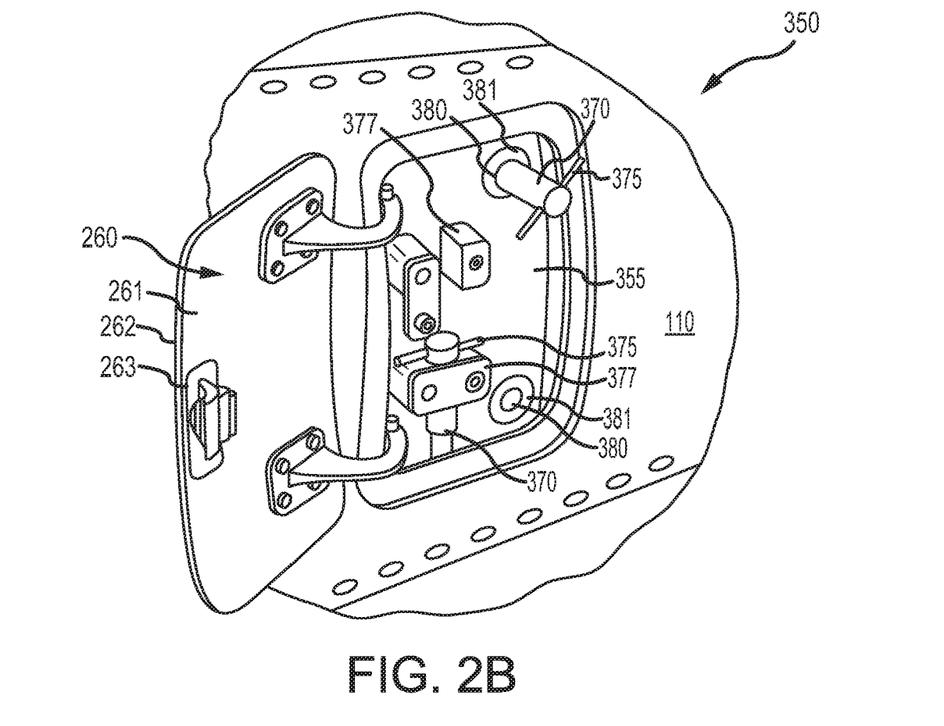
FIG. 2B illustrates a perspective view of a maintenance panel for a thrust reverser having with varied pin holders, pin handles, and door locks, in accordance with various embodiments.

In various embodiments, maintenance panel 250 may comprise one or more panel pin holes 280. For example, maintenance panel 250 may comprise a panel pin hole 280 corresponding to each door 130 (with brief reference to FIGS. 1A and 1B). Each panel pin hole 280 may define a void through panel recess 255. Each panel pin hole 280 may be configured to at least partially align with a door pin hole (e.g., door pin hole 137, with brief reference to FIG. 3A) in response to the door being in the deployed position, as discussed further herein. Panel pin hole 280 may be sized and shaped to receive safety pin 270. In that respect, safety pin 270 may be configured to insert through panel pin hole 280, as discussed further herein. In various embodiments, and with brief reference to FIG. 2B, a panel pin hole 380 may further be coupled to a bushing 381. In that respect, panel pin hole 380 may define a void through panel recess 255. Bushing 381 may be configured to cover the circumferential surfaces of panel pin hole 380 to at least partially protect the circumferential surfaces of panel pin hole 380 in response to safety pin 270 being inserted into panel pin hole 380.

In various embodiments, and with reference again to FIG. 2A, safety pin 270 may be removably coupled to maintenance panel 250 via a pin holder 277. Pin holder 277 may be coupled to panel recess 255. Pin holder 277 may comprise any suitable mechanism capable of restraining safety pin 270. For example, pin holder 277 may comprise a tether or the like configured to tie around safety pin 270 to restrain safety pin 270. With brief reference to FIG. 2B and in accordance with various embodiments, a pin holder 377 for a maintenance panel 350 may also comprise a rotating latch configured to rotate from a locked position to an access position. In the locked position, pin holder 377 may be configured to restrain safety pin 370. In the access position, pin holder 377 may rotate to allow access and removal of safety pin 370. Pin holder 377 may also comprise any other suitable mechanism, apparatus, or the like capable of restraining safety pin 370.

With reference again to FIG. 2A, and in accordance with various embodiments, safety pin 270 may comprise a pin handle 275. Pin handle 275 may configured to aid in removing safety pin 270. Pin handle 275 may also be configured to aid in inserting safety pin 270 into panel pin hole 280. In that respect, safety pin 270 may comprise any suitable pin handle 275 having any suitable or desired shape, size, material, or the like. For example, pin handle 275 may comprise a Y-shape, a T-shape, a knob, or any other suitable shaped handle. With brief reference to FIG. 2B, pin handle 375 may also comprise a pin inserted through an end of safety pin 370 (e.g., forming a t-shaped handle).

Figure 3A:
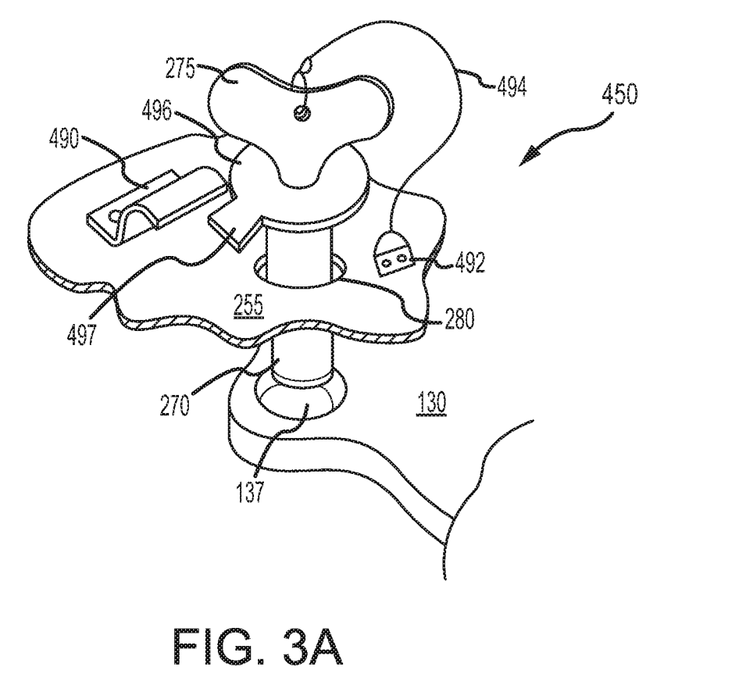
FIG. 3A illustrates a perspective view of a safety pin interacting with a panel pin hole and a door pin hole, and a maintenance panel having a curved safety retainer configured to engage the safety pin, in accordance with various embodiments.

In various embodiments, and with reference to FIG. 3A, safety pin 270 is depicted engaging panel recess 255 and door 130. In that respect, safety pin 270 may be inserted through panel pin hole 280 and door pin hole 137. Door pin hole 137 may define a void through an outer surface of door 130. In response to door 130 being in the deployed position, door pin hole 137 may be configured to at least partially align with panel pin hole 280, thus allowing safety pin 270 to be inserted through panel pin hole 280 and door pin hole 137. Inserting safety pin 270 through panel pin hole 280 and door pin hole 137 may at least partially limit rotation of door 130 from the deployed position into the closed position.

In various embodiments, a maintenance panel 450 may also comprise a safety pin retainer 490. Safety pin retainer 490 may be coupled to panel recess 255 proximate panel pin hole 280. Safety pin retainer 490 may be configured to engage safety pin 270 in response to safety pin 270 being inserted through panel pin hole 280 and door pin hole 137. In that regard, safety pin retainer 490 may engage safety pin 270 to at least partially retain safety pin 270 in panel pin hole 280 and door pin hole 137. Safety pin retainer 490 may comprise any suitable shape capable of retaining safety pin 270. For example, safety pin retainer 490 may comprise an outer surface having a curvature such that safety pin 270 may be configured to engage only a portion of an inner surface of safety pin retainer 490. Safety pin 270 may comprise a pin retaining body 496 coupled to safety pin 270 proximate pin handle 275. Pin retaining body 496 may comprise a pin retaining protrusion 497. Pin retaining protrusion 497 may be configured to engage safety pin retainer 490. For example, pin retaining protrusion 497 may be sized and shaped such that in response to safety pin 270 being rotated towards safety pin retainer 490, pin retaining protrusion 497 may be configured to insert between an inner surface of safety pin retainer 490 and panel recess 255.

Figure 3B:
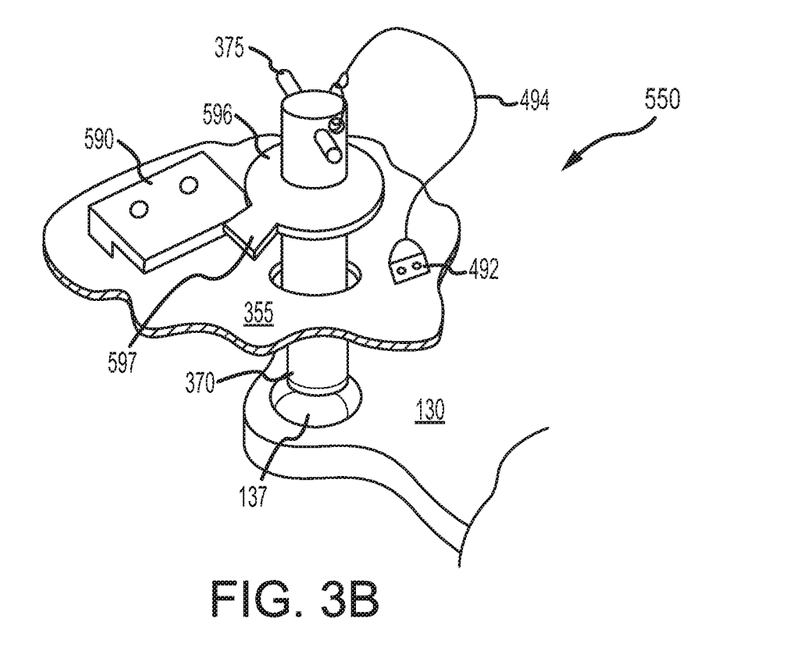
FIG. 3B illustrates a perspective view of a safety pin interacting with a panel pin hole and a door pin hole, and a maintenance panel having a flat safety retainer configured to engage the safety pin, in accordance with various embodiments.

With reference to FIG. 3B and in accordance with various embodiments, a safety pin retainer 590 may also comprise a flat outer surface. Safety pin 370 may be coupled to a pin retaining body 596. Pin retaining body 596 may be similar to pin retaining body 496, with brief reference to FIG. 3A. Pin retaining body 596 may comprise a pin retaining protrusion 597. Pin retaining protrusion 597 may be similar to pin retaining protrusion 497, with brief reference to FIG. 3A. In response to safety pin 370 being rotated towards pin retaining body 596, pin retaining protrusion 597 may be configured to insert between an outer surface of safety pin retainer 590 and panel recess 255.

In various embodiments and with reference again to FIG. 3A, maintenance panel 450 may comprise a safety pin tether 494. Safety pin tether 494 may be coupled at a first end to pin handle 275 and at a second end to a tether coupling point 492. Tether coupling point 492 may be coupled to panel recess 255. Safety pin tether 494 may be configured to secure safety pin 270 within panel recess 255. For example, safety pin tether 494 may be configured to secure safety pin 270 in response to safety pin 270 disengaging from panel pin hole 280 and door pin hole 137, or in response to safety pin 270 being dropped my maintenance personnel or the like. In that regard, safety pin tether 494 may comprise a length such that safety pin 270 may be removed from panel recess 255 and inserted through panel pin hole 280 and door pin hole 137.

Figure 4:
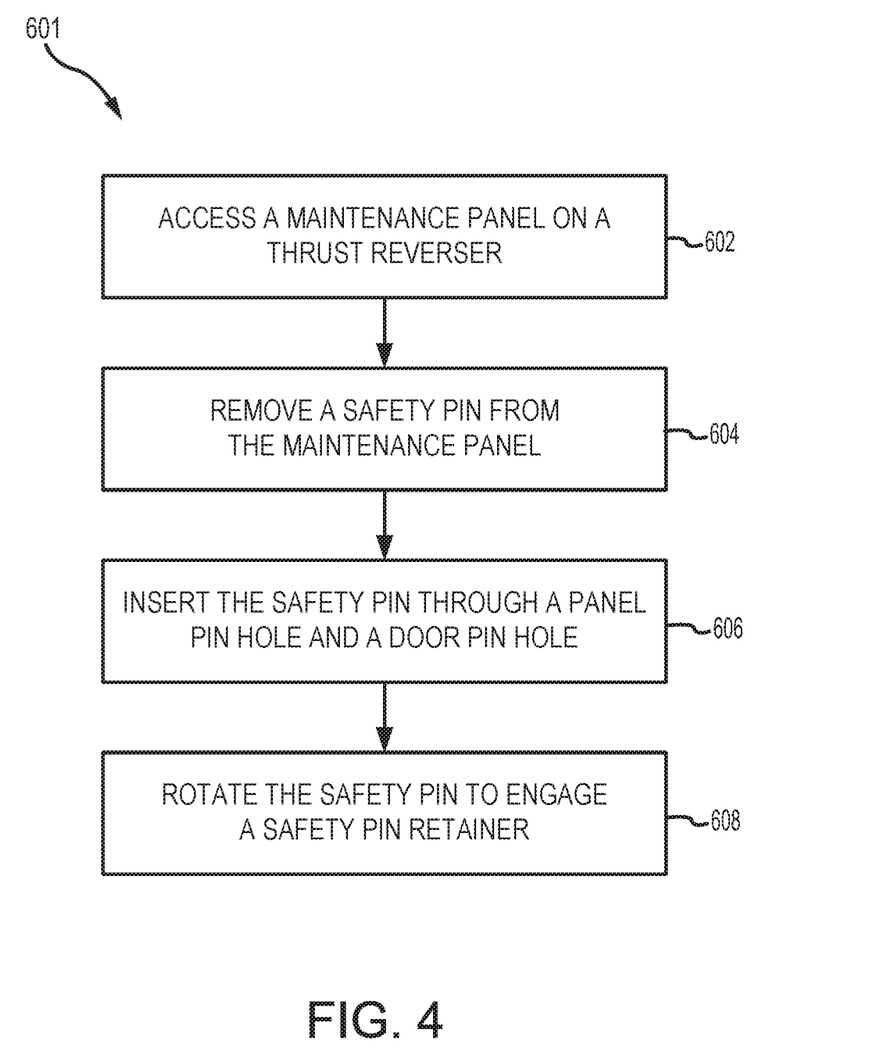
FIG. 4 illustrates a process flow for a method of locking a thrust reverser door into a deployed position, in accordance with various embodiments.

In various embodiments, and with reference to FIG. 4, a method 601 for locking a thrust reverser door into a deployed position is disclosed. With additional reference to FIG. 2A, method 601 may comprise accessing maintenance panel 250 on thrust reverser 100 (step 602). For example, panel door 260 may be opened to access components in panel recess 255. Method 601 may comprise removing safety pin 270 from maintenance panel 250 (step 604). For example, safety pin 270 may be disengaged from pin holder 277. With additional reference to FIG. 3A, method 601 may comprise inserting safety pin 270 into panel pin hole 280 and door pin hole 137 (step 606). Method 601 may comprise rotating safety pin 270 to engage safety pin retainer 490 (step 608). Safety pin 270 may be rotated, via pin handle 275, until pin retaining protrusion 497 of pin retaining body 496 engages safety pin retainer 490. For example, pin retaining protrusion 497 may insert between panel recess 255 and an inner surface of safety pin retainer 490 such that safety pin 270 is at least partially limited from movement in the radial direction. In response to safety pin 270 engaging safety pin retainer 490, door 130 may be at least partially locked into the deployed position.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A maintenance panel for a thrust reverser, comprising:
 a panel recess;
 a panel pin hole defining a void through the panel recess;
 a safety pin removably coupled to the panel recess, wherein the safety pin is configured to insert within the panel pin hole and align with a door pin hole of the thrust reverser; and
 a pin holder coupled to the panel recess, wherein the safety pin is configured to removably couple to the panel recess via the pin holder, and wherein the pin holder is configured to restrain the safety pin.

2. The maintenance panel of claim 1, further comprising a panel door having an interior surface opposite an exterior surface, wherein the panel door is rotatably coupled to the panel recess, and wherein the panel door is configured to rotate from a closed position to an open position to allow access to the maintenance panel.

3. The maintenance panel of claim 2, wherein the interior surface of the panel door comprises a color including at least one of red, yellow, orange, and green.

4. The maintenance panel of claim 2, wherein the panel door is rotatably coupled to the panel recess with a spring-loaded hinge.

5. The maintenance panel of claim 1, further comprising a safety retainer coupled to the panel recess, wherein in response to the safety pin being inserted within the panel pin hole the safety retainer is configured to engage the safety pin.

6. The maintenance panel of claim 5, wherein the safety pin comprises a pin retaining body configured to engage the safety retainer.

7. The maintenance panel of claim 1, further comprising a safety pin tether coupled at a first end to the panel recess and at a second end to the safety pin, wherein the safety pin tether is configured to secure the safety pin.

8. The maintenance panel of claim 1, wherein the safety pin comprises a pin handle.

9. A thrust reverser, comprising:
   a fixed beam;
   a door pivotally coupled to the fixed beam and configured to pivot from a closed position to a deployed position, wherein the door comprises a door pin hole defining a first void through an outer surface of the door; and
   a maintenance panel defining a panel recess on the fixed beam, the maintenance panel comprising:
      a panel pin hole defining a second void through the panel recess, wherein the panel pin hole and the door pin hole are configured to align in response to the door being in the deployed position;
      a safety pin removably coupled to the panel recess, wherein the safety pin is configured to align with the door pin hole and insert through the panel pin hole and the door pin hole to prevent movement of the door from the deployed position; and
      a pin holder coupled to the panel recess, wherein the safety pin is configured to removably couple to the panel recess via the pin holder.

10. The thrust reverser of claim 9, further comprising a panel door having an interior surface opposite an exterior surface, wherein the panel door is rotatably coupled to the panel recess, and wherein the panel door is configured to rotate from a closed panel position to an open panel position to allow access to the maintenance panel.

11. The thrust reverser of claim 10, wherein the interior surface of the panel door comprises color including at least one of red, yellow, orange, and green.

12. The thrust reverser of claim 10, wherein the panel door is rotatably coupled to the panel recess with a spring-loaded hinge.

13. The thrust reverser of claim 9, further comprising a safety retainer coupled to the panel recess, wherein in response to the safety pin being inserted within the panel pin hole the safety retainer is configured to engage the safety pin.

14. The thrust reverser of claim 13, wherein the safety pin comprises a pin retaining body configured to engage the safety retainer.

15. The thrust reverser of claim 9, further comprising a safety pin tether coupled at a first end to the panel recess and at a second end to the safety pin, wherein the safety pin tether is configured to secure the safety pin.

16. A method of locking a door on a thrust reverser into a deployed position, comprising:
   removing a safety pin from a pin holder of a maintenance panel, wherein the maintenance panel defines a panel recess on an outer surface of the thrust reverser, and wherein the pin holder is disposed within the panel recess; and
   inserting the safety pin through a panel pin hole and a door pin hole, wherein the panel pin hole defines a first void through the panel recess and the door pin hole defines a second void through the door, and wherein in response to the safety pin being inserted through the panel pin hole and the door pin hole, movement of the door from the deployed position is limited; and
   rotating the safety pin to engage a safety retainer, wherein the safety retainer is coupled to the panel recess.

17. The method of claim 16, further comprising accessing the maintenance panel by opening a panel door pivotally coupled to the panel recess.

\* \* \* \* \*